(12) United States Patent
Wong et al.

(10) Patent No.: US 8,787,177 B2
(45) Date of Patent: Jul. 22, 2014

(54) TECHNIQUES FOR RADIO LINK PROBLEM AND RECOVERY DETECTION IN A WIRELESS COMMUNICATION SYSTEM

(75) Inventors: Ian Wong, Austin, TX (US); Taeyoon Kim, Austin, TX (US)

(73) Assignee: Apple Inc., Cupertino, CA (US)

( * ) Notice: Subject to any disclaimer, the term of this patent is extended or adjusted under 35 U.S.C. 154(b) by 669 days.

(21) Appl. No.: 12/263,998

(22) Filed: Nov. 3, 2008

(65) Prior Publication Data
US 2010/0110901 A1 May 6, 2010

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl.
USPC ........................................ 370/242

(58) Field of Classification Search
USPC .......................... 370/252, 332, 333
See application file for complete search history.

(56) References Cited

U.S. PATENT DOCUMENTS

| | | | |
|---|---|---|---|
| 2004/0176038 A1* | 9/2004 | Luo et al. ................. | 455/67.11 |
| 2005/0255807 A1* | 11/2005 | Araki et al. .................... | 455/23 |
| 2006/0285484 A1* | 12/2006 | Papasakellariou et al. ... | 370/208 |
| 2007/0124654 A1* | 5/2007 | Smolinske et al. ........... | 714/786 |
| 2007/0149234 A1* | 6/2007 | Bomash ........................ | 455/522 |
| 2007/0183335 A1 | 8/2007 | Pietraski et al. | |
| 2007/0216545 A1* | 9/2007 | Li et al. .......................... | 341/50 |
| 2007/0238430 A1 | 10/2007 | Himayat et al. | |
| 2008/0031370 A1 | 2/2008 | Guey et al. | |
| 2008/0114529 A1* | 5/2008 | Hiruta et al. .................. | 701/117 |
| 2008/0214230 A1* | 9/2008 | Shinozaki ..................... | 455/522 |
| 2008/0273616 A1* | 11/2008 | Papasakellariou ............ | 375/260 |
| 2009/0296864 A1* | 12/2009 | Lindoff et al. ................ | 375/357 |
| 2010/0034092 A1* | 2/2010 | Krishnamurthy et al. .... | 370/241 |
| 2010/0041389 A1* | 2/2010 | Cave et al. .................... | 455/423 |
| 2010/0311411 A1* | 12/2010 | Lindbom et al. .............. | 455/424 |

OTHER PUBLICATIONS

Details on Radio Link Failure and Recovery in LTE, R4-081998, Motorola, Aug. 2008.
Considerations on Radio Link Failure, R4-080727, Nokia, Mar. 2008.
Radio Link Problem Detection by the UE, R4-081726, Nortel, Aug. 2008.
PCT Application PCT/US2009/061445 Search Report and Written Opinion, mailed Jun. 9, 2010.

* cited by examiner

*Primary Examiner* — Huy D Vu
*Assistant Examiner* — Adnan Baig
(74) *Attorney, Agent, or Firm* — Fay Kaplun & Marcin, LLP

(57) ABSTRACT

A technique for radio link detection in a wireless communication system includes estimating a first error rate of an indicator channel. In this case, the indicator channel includes an indication of a number of symbols in a control channel. A second error rate of the control channel is also estimated. The first and second error rates are then combined to provide a performance metric. Based on the performance metric, a determination is made as to whether a radio link problem exists.

38 Claims, 5 Drawing Sheets

TECHNIQUES FOR RADIO LINK PROBLEM AND RECOVERY DETECTION IN A WIRELESS COMMUNICATION SYSTEM

BACKGROUND

1. Field

This disclosure relates generally to a wireless communication system and, more specifically, to techniques for radio link problem and recovery detection in a wireless communication system.

2. Related Art

As is well known, a wireless channel provides an arbitrary time dispersion, attenuation, and phase shift in a transmitted signal. While the implementation of orthogonal frequency division multiplexing (OFDM) with a cyclic prefix in a wireless communication system mitigates the effect of time dispersion caused by a wireless channel, in order to apply linear modulation schemes it is also usually necessary to remove amplitude and phase shift caused by the wireless channel. Channel estimation is typically implemented in a wireless communication system to provide an estimate (from available pilot information) of an amplitude and phase shift caused by a wireless channel. Equalization may then be employed in the wireless communication system to remove the effect of the wireless channel and facilitate subsequent symbol demodulation. Channel tracking is also usually employed to periodically update an initial channel estimation. For example, channel tracking may be employed to facilitate periodic frequency-domain and time-domain channel correlation and periodic updating of channel signal-to-noise ratio (SNR), channel delay spread, and channel Doppler effect.

Known approaches for detecting a radio link problem (RLP) and a radio link recovery (RLR) in wireless communication systems suffer from significant shortcomings that affect the accuracy and/or testability of a detection approach. Unfortunately, without a good RLP/RLR metric that is both accurate, easily implementable, and testable, wireless communication system performance inevitably degrades. For example, in a third-generation partnership project long-term evolution (3GPP LTE) compliant wireless communication system, user equipment (UE) must be able to accurately detect a radio link problem (RLP) and a radio link recovery (RLR) to prevent performance degradation of the system.

A known first approach for determining an RLP and an RLR at a UE in an LTE compliant wireless communication system has proposed using a physical control format indicator channel (PCFICH) and a pseudo-error rate that is based on received symbols. Unfortunately, the first approach may be inaccurate as there is no clear indication of whether the decoded message is correct due to the absence of an error detection code (e.g., a cyclic redundancy check (CRC)) and the small number of subcarriers associated with the PCFICH (e.g., 16 subcarriers in an LTE system). A known second approach for determining an RLP and an RLR at a UE in an LTE compliant wireless communication system has proposed using a combination of an actual PCFICH and an actual physical downlink control channel (PDCCH) to detect radio link failure. Unfortunately, a UE may not always get a PDCCH grant and, thus, logging a CRC error rate is usually inaccurate as the UE cannot distinguish between a true decoding error and the absence of a PDCCH grant. In addition, the second approach also uses the actual PCFICH which does not have an associated CRC.

A known third approach for determining an RLP and an RLR at a DE in a wireless communication system has proposed using a hypothetical PDCCH transmission to map to an estimate of a block error rate (BLER) as the metric for RLF detection. While overcoming most of the shortcomings in the above-referenced approaches, the third approach still neglects the fact that a successful PCFICH decoding is necessary before a PDCCH can be decoded correctly. As such, the third approach may provide an overly optimistic result, which could be problematic in environments with low signal-to-interference and noise ratios (SINRs) where radio link failure (RLF) is expected to occur. Furthermore, the third approach is not particularly feasible from a conformance testing point of view as a PDCCH error rate is not observable without PCFICH errors. As such, a UE may experience behavior consistency problems when the third approach is employed.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
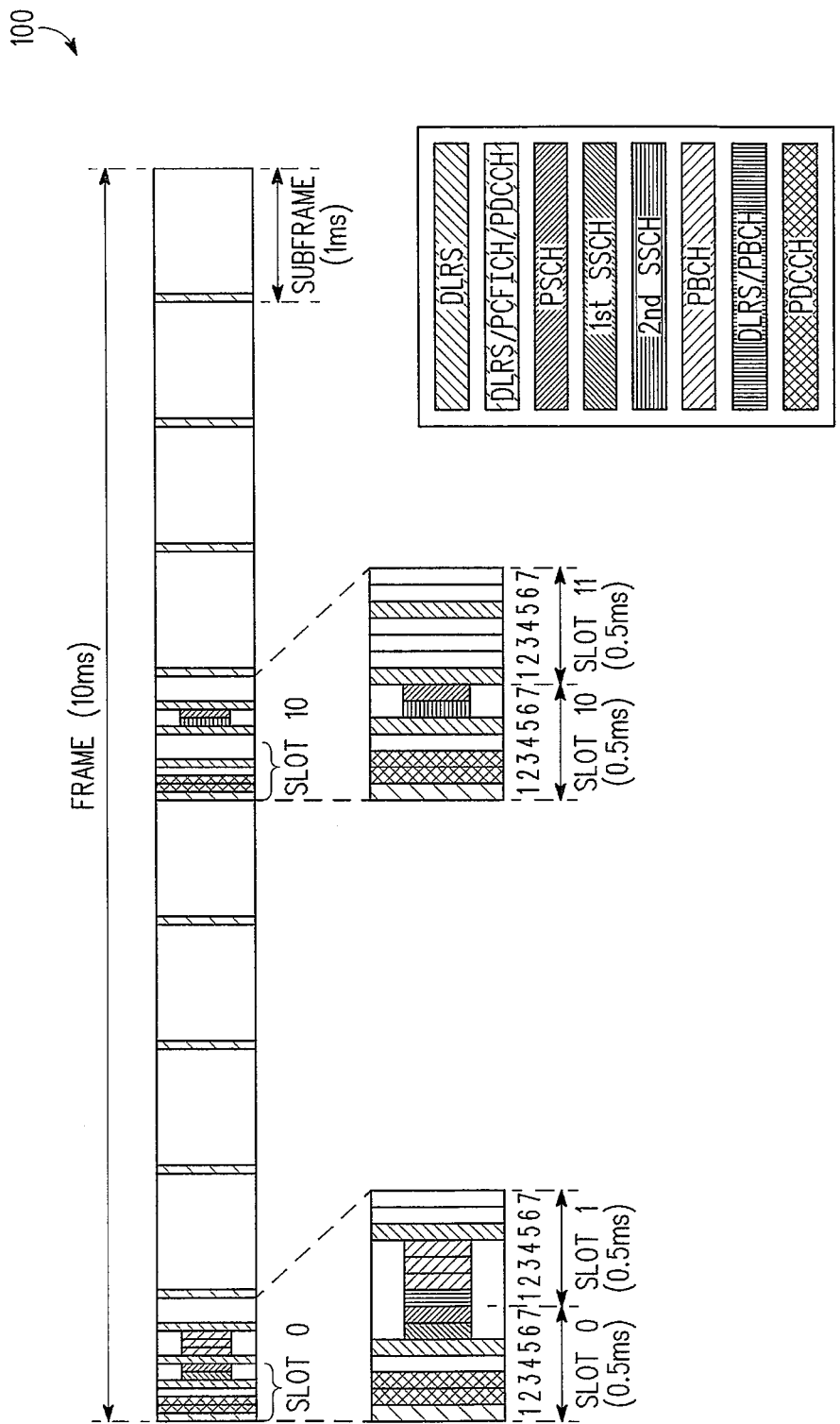
FIG. 1 is a diagram of a relevant portion of an example downlink (DL) frame transmitted from a serving base station (BS) in a long-term evolution (LTE) compliant wireless communication system.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although the preferred embodiment is described below in conjunction with a subscriber station (SS), such as a cellular handset, it will be appreciated that the present invention is not so limited and may potentially be embodied in various wireless communication devices.

As used herein, the term "channel" includes one or more subcarriers, which may be adjacent or distributed across a frequency band. Moreover, the term "channel" may include an entire system bandwidth or a portion of the entire system bandwidth. As used herein, the term "reference signal" is synonymous with the term "pilot signal." As is also used herein, the term "subscriber station" is synonymous with the term "user equipment," which includes a wireless communication device that may (or may not) be mobile. In general, a reference signal (RS), when received at a subscriber station (SS), is utilized by the SS to perform channel estimation. The disclosed techniques are contemplated to be applicable to systems that employ a wide variety of signaling techniques, e.g., orthogonal frequency division multiplex (OFDM) signaling and single-carrier frequency division multiple access (SC-FDMA) signaling. As used herein, the term "coupled" includes a direct electrical connection between blocks or components and an indirect electrical connection between blocks or components achieved using one or more intervening blocks or components.

In general, accurate channel estimation is desirable to achieve acceptable performance for SSs in a wireless communication system (e.g., a long-term evolution (LTE) wireless communication system) as downlink (DL) performance is determined by the accuracy of channel estimation. In an LTE compliant system, RSs are distributed in a subframe and, as such, interpolation may be used to perform channel estimation for an entire time-frequency grid of an OFDM signal. In the case of an LTE compliant system having a 1.4 MHz system bandwidth, only twelve downlink reference signal (DLRS) subcarriers are currently allocated (in a first symbol of each subframe) for channel estimation. It should be appreciated that while the discussion herein is directed to an LTE compliant system, the techniques disclosed herein are broadly applicable to improving radio link failure and recovery detection in any wireless communication system that employs an indicator channel that includes an indication of a number of symbols in an associated control channel.

In a 3GPP-LTE wireless communication system, it is desirable (for proper system operation) for an SS to accurately detect a radio link problem (RLP) and a radio link recovery (RLR). The detection of an RLP may lead to a radio link failure (RLF) detection, i.e., an RLP for a sustained period of time, at which point an SS can shut off an associated transmitter independent from network commands and, in this manner, prevent the SS from causing excessive interference on an uplink (UL). On the other hand, an RLR detection results in the SS switching the associated transmitter back on to facilitate a UL connection. According to various aspects of the present disclosure, techniques are disclosed that accurately and efficiently detect an RLP and an RLR.

According to various embodiments of the present disclosure, a hypothetical physical control format indicator channel (PCFICH) transmission and a hypothetical physical downlink control channel (PDCCH) transmission are combined (e.g., added or scaled and then added) to provide a quality metric for RLP, RLF, and RLR detection. The quality metric may take various forms, e.g., a signal-to-interference and noise ratio (SINR) or a signal-to-noise ratio (SNR). The quality metric for the hypothetical channels may be estimated by performing interpolation based on reference signals (pilot signals) that are, for example, located on opposite sides of the hypothetical channels.

In one embodiment, a two-step exponential effective SINR mapping (EESM) is employed to map an estimated SINR for resource elements for which the PCFICH would be transmitted to an error rate and map an estimated SINR for resource elements for which the PDCCH would be transmitted to an error rate. The error rates for the hypothetical PCFICH and PDDCH may then be combined (e.g., added or scaled and then added) to estimate a combined (PCFICH and PDCCH) error rate. The estimated combined error rate may be averaged over time (e.g., 200 milliseconds for RLP and 100 milliseconds for RLR) after which the averaged combined error rate may be compared against thresholds (e.g., Qin and Qout, respectively) to determine RLP and RLR, respectively. That is, if the average combined error rate is greater than Qout, an RLP is detected. Similarly, if the average combined error rate is less than Qin, an RLR is detected. In an alternative embodiment, quality metrics for the PCFICH and the PDDCH may be combined and then mapped to an error rate. In the alternative embodiment, the quality metrics may be scaled prior to being combined. In yet another alternative embodiment, a combined quality metric is derived for the PCFICH and the PDDCH. The combined quality metric is then mapped to an error rate.

It should be appreciated that a wide variety of transmission formats for both PCFICH and PDCCH may be employed for determining a quality metric. A control format indicator (CFI) transmitted on PCFICH may be set to, for example, three (CFI=3), which implies three orthogonal frequency division multiplexing (OFDM) symbols for control if a bandwidth (BW) configuration has greater than six resource blocks (RBs) and four OFDM symbols otherwise. As one example, a 'format 0' PDCCH transmission in eight control channel elements (CCEs) for RLP detection and a 'format 1C' PDCCH transmission in four CCES for RLR detection may be assumed.

In general, when an SS cannot decode even the most reliable control message, an RLP should be declared. If an SS can successfully decode a broadcast message, which is typically transmitted in 'format 1C' for an LTE compliant system, then the SS can be considered to be in synchronization with a serving base station (BS). Alternatively, a same format, e.g., 'format 0' may be assumed for both RLP and RLR detection while performing the estimates. For ease of understanding herein, a same format is assumed for both RLP and RLR. In a typical implementation, a table of constants that determine a specific mapping function from subcarrier SINRs into an effective SINR (that can be used to estimate an error rate (e.g., a block error rate (BLER)) for both PCFICH and PDCCH) is developed off-line. For example, using an EESM approach a beta (β) value for each transmission configuration (e.g., 1×2, 2×2 space frequency block coding (SFBC), and 4×2 SFBC) and for each format for a PCFICH and a PDCCH may be computed off-line and stored in a look-up table.

For each subframe 'n' in a connected mode, the SS estimates a received SINR (γi) for each subcarrier corresponding to a hypothetical PCFICH transmission and computes an effective SINR (γeff), e.g., using an EESM approach, as follows:

$$\gamma_{\mathit{eff}} = -\beta \ln\left(\frac{1}{N}\sum_{i=1}^{N} e^{-\frac{\gamma_i}{\beta}}\right)$$

where N is the number of subcarriers for a channel and beta (β) is a constant that depends on a channel format and a system configuration. The effective SINR (γeff) may then be used to determine the PCFICH BLER in additive white Gaussian noise (AWGN), which is the BLER estimate for the PCFICH transmission (referred to herein as PCFICH_BLER). In a typical implementation, the above steps are then performed for the PDCCH to estimate the PDCCH BLER (referred to herein as PDCCH_BLER). A running average of both the PCFICH_BLER and PDCCH_BLER may then be performed. For example, one can either use a true average, an exponential average, or a weighted average as set forth below:

$$PCFICH\_BLER(n)=\alpha PCFICH\_BLER(n-1)+(1-\alpha)PCFICH\_BLER$$

$$PDCCH\_BLER(n)=\alpha PCFICH\_BLER(n-1)+(1-\alpha)PDCCH\_BLER$$

where $0<\alpha<1$ is an averaging constant related to the averaging window length (e.g., 200 subframes, which may correspond to 200 milliseconds in an LTE compliant system).

After an initial period of the window length and at an end of each reporting period (e.g., 10 frames, which may correspond to 100 milliseconds in an LTE compliant system) thereafter, a combined (PCFICH/PDCCH) error rate may be estimated, for example, as follows:

$$Combined\_BLER(n)=1-(1-PCFICH\_BLER(n))*(1-PDCCH\_BLER(n))$$

A routine for reporting an RLP may be implemented, for example, using the following code:

```
while Combined_BLER(n) > Qout
    Report radio link problem to higher layers
    if Combined_BLER(n) < Qin
        Radio link recovery detected
        break from reporting RLP
    end
end
```

Since a true successful PDCCH decoding requires a likewise successful PCFICH decoding, the techniques described herein provide a more accurate performance metric for RLF and RLR detection than known approaches, especially in environments with low SINRs where RLP is expected to occur. Furthermore, the disclosed techniques are readily testable as PDCCH can only be tested when PCFICH is also present and the presence of a PDCCH CRC can accurately determine a true error rate, which can be used as the benchmark for the accuracy of the RLP or RLR detected by the SS in conformance testing.

According to one embodiment of the present disclosure, a technique for radio link detection in a wireless communication system includes estimating a first error rate of an indicator channel. In this case, the indicator channel includes an indication of a number of symbols in a control channel. A second error rate of the control channel is also estimated. The first and second error rates are then combined to provide a performance metric. Based on the performance metric, a determination is made as to whether a radio link problem exists.

According to another embodiment of the present disclosure, a wireless communication device includes a receiver and a processor coupled to the receiver. The processor is configured to estimate a first error rate of an indicator channel. In this case, the indicator channel includes an indication of a number of symbols in a control channel. The processor is also configured to estimate a second error rate of the control channel. The processor is further configured to combine the first and second error rates to provide a performance metric. The processor is also configured to determine whether a radio link problem exists based on the performance metric.

According to another aspect of the present disclosure, a technique for radio link detection in a wireless communication system includes estimating a combined effective signal-to-interference and noise ratio for a control channel and an indicator channel, which includes an indication of a number of symbols in the control channel. The combined effective signal-to-interference and noise ratio is then mapped to a block error rate. Based on the block error rate, a determination is made as to whether a radio link problem, a radio link failure, or a radio link recovery exists.

With reference to FIG. 1, a relevant portion of an example downlink frame 100, which is transmitted from a serving base station (BS) in an LTE compliant system, is illustrated. As is shown, the frame 100 (which is 10 milliseconds in length) includes ten subframes (each of which are 1 millisecond in length). Each of the subframes begins with a symbol that includes, among other items, one or more reference signals (RSs), a physical control format indicator channel (PCFICH) and one or more physical downlink control channels (PDCCH) (labeled 'DLRS/PCFICH/PDCCH'). In the illustrated example, a DL subframe includes two slots, each of which include seven long blocks (LBs) which encode a symbol. It should be appreciated that the techniques disclosed herein are broadly applicable to UL subframes that employ more or less than the illustrated number of LBs. With reference to Slot0, a $1^{st}$ secondary synchronization channel (SSCH) is assigned to LB 6 and a primary synchronization channel (PSCH) is assigned to LB 7. With reference to Slot11, a $2^{nd}$ SSCH is assigned to LB 6 and the PSCH is also assigned to LB 7. With reference to Slot1, a primary broadcast channel (PBCH) is assigned to LB 1 (labeled 'DLRS/PBCH') and LBs 2-4.

Figure 2:
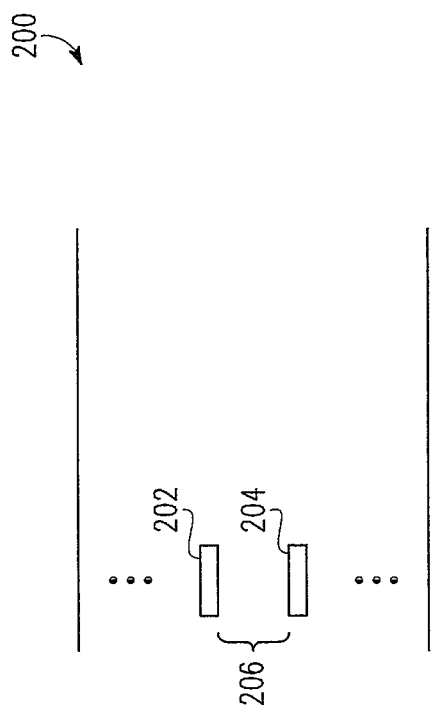
FIG. 2 is an example diagram of a relevant portion of a frequency spectrum that depicts a channel (e.g., a physical control format indicator channel (PCFICH) or a physical downlink control channel (PDCCH)) that is to be estimated based on reference signals (RSs) located on opposite sides of the channel, according to one embodiment of the present invention.

With reference to FIG. 2, an example diagram of a relevant portion of a frequency spectrum 200 that depicts a channel 206 (e.g., a physical control format indicator channel (PCFICH) or a physical downlink control channel (PDCCH)) that is to be estimated based on reference signals (RSs) 202 and 204, which are located on opposite sides of the channel, is illustrated. As mentioned above, a quality metric for the channel 206 may be derived through interpolation of quality metrics associated with the RSs 202 and 204. Alternatively, a quality metric for the channel 206 may derived in another manner.

Figure 3:
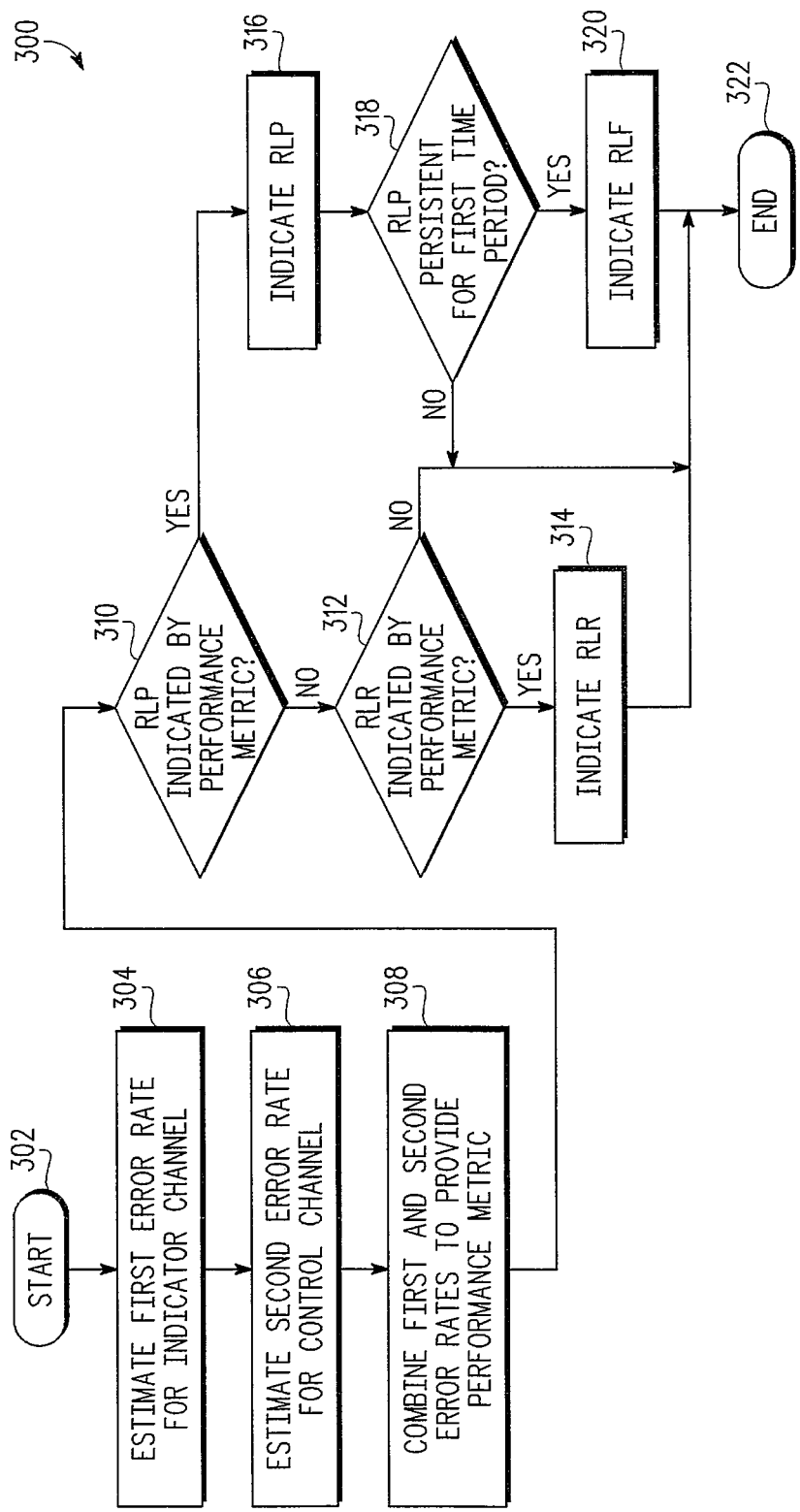
FIG. 3 is a flowchart of an example process for performing radio link problem (RLP), radio link failure (RLF), and radio link recovery (RLR) detection, according to one aspect of the present invention.

Turning to FIG. 3, an example process 300 for performing radio link problem (RLP), radio link failure (RLF), and radio link recovery (RLR) detection, according to one aspect of the present invention, is depicted. The process 300 is initiated at block 302, at which point control transfers to block 304. In block 304, a control unit (e.g., a processor or an application specific integrated circuit (ASIC)) of an SS estimates a first error rate (e.g., a block error rate (BLER)) for an indicator channel, which includes an indication of a number of symbols in a control channel. As noted above, the first error rate may be estimated based on various quality metrics (e.g., SNR or SINR) associated with reference signals (RSs) located on opposite sides of the indicator channel. For example, the control unit may estimate an effective SINR for the indicator channel (based on interpolation of the SINRs of respective RSs located on opposite sides of the indicator channel) and map the estimated SINR for the indicator channel to the first error rate. Next, in block 306, the control unit of the SS estimates a second error rate (e.g., a BLER) for the control channel. As mentioned above, the second error rate may also be based on interpolation of various quality metrics associated with RSs located on opposite sides of the control channel. For example, the control unit may estimate an effective SINR for the control channel using interpolation of the SINRs associated with respective RSs located on opposite sides of the control channel and map the estimated SINR for the control channel to the second error rate.

Then, in block 308, the first and second error rates (which may be BLERs) are combined (e.g., added together or scaled and then added together) to provide a performance metric (e.g., a combined BLER). Next, in decision block 310, the control unit determines whether an RLP is indicated by the performance metric (e.g., whether the combined BLER is above a first threshold). If an RLP is indicated in block 310, control transfers to block 316, where the RLP is reported, e.g., to a higher layer. For example, when multiple RLPs have been reported, the higher layer may initiate power-down of a transmitter of an SS such that the SS does not cause excessive interference on a UL. Then, in decision block 318, the processor determines whether the RLP has been persistent for a first time period (e.g., whether the combined BLER has exceeded the first threshold for the first time period).

If an RLP is not persistent for the first time period, control transfers from block 318 to block 322 where the process 300 terminates and control returns to a calling routine. If an RLP is persistent for the first time period, control transfers to block 320 where an RLF is reported. From block 320 control transfers to block 322. If an RLP is not indicated in block 310, control transfers to decision block 312, where the control unit determines if an RLR is indicated by the performance metric (e.g., whether the combined BLER is below a second threshold). If an RLR is indicated in block 312, control transfers to block 314, where the RLR is reported. Following block 314, control transfers to block 322. If an RLR is not indicated in block 312, control transfers to block 322.

Figure 4:
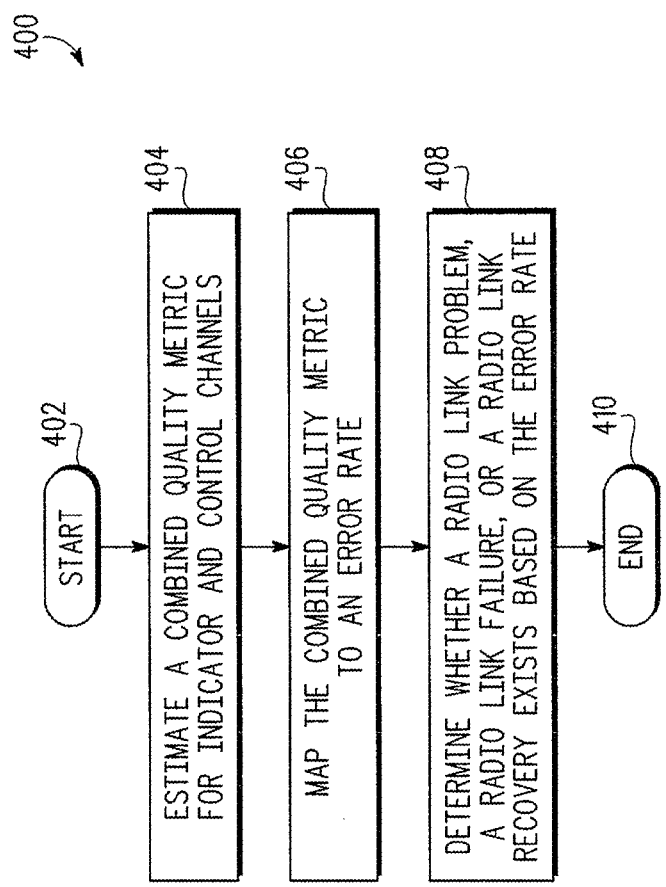
FIG. 4 is a flowchart of an example process for performing RLP, RLF, and RLR detection, according to another aspect of the present invention.

With reference to FIG. 4, a process 400 for radio link detection in a wireless communication system, according to another embodiment of the present disclosure, is illustrated. In block 402 the process 400 is initiated at which point control transfers to block 404. In block 404, a combined quality metric (e.g., an SNR or an SINR) for a control channel and an indicator channel, which includes an indication of a number of symbols in the control channel, is estimated. The combined quality metric may, for example, be based on interpolation of quality metrics associated with respective RSs located on opposite sides of the channels. The quality metrics for the control and indicator channels may, for example, be combined by addition or may be scaled and then added together. Next, in block 406, the quality metric is mapped to an error rate (e.g., a BLER). Then, in block 408, based on the error rate, a determination is made (based on whether the error rate is above a first threshold, above the first threshold for a first time period, or below a second threshold) as to whether a radio link problem, a radio link failure, or a radio link recovery exists. From block 408 control transfers to block 410 where the process 400 terminates and control returns to a calling routine.

Figure 5:
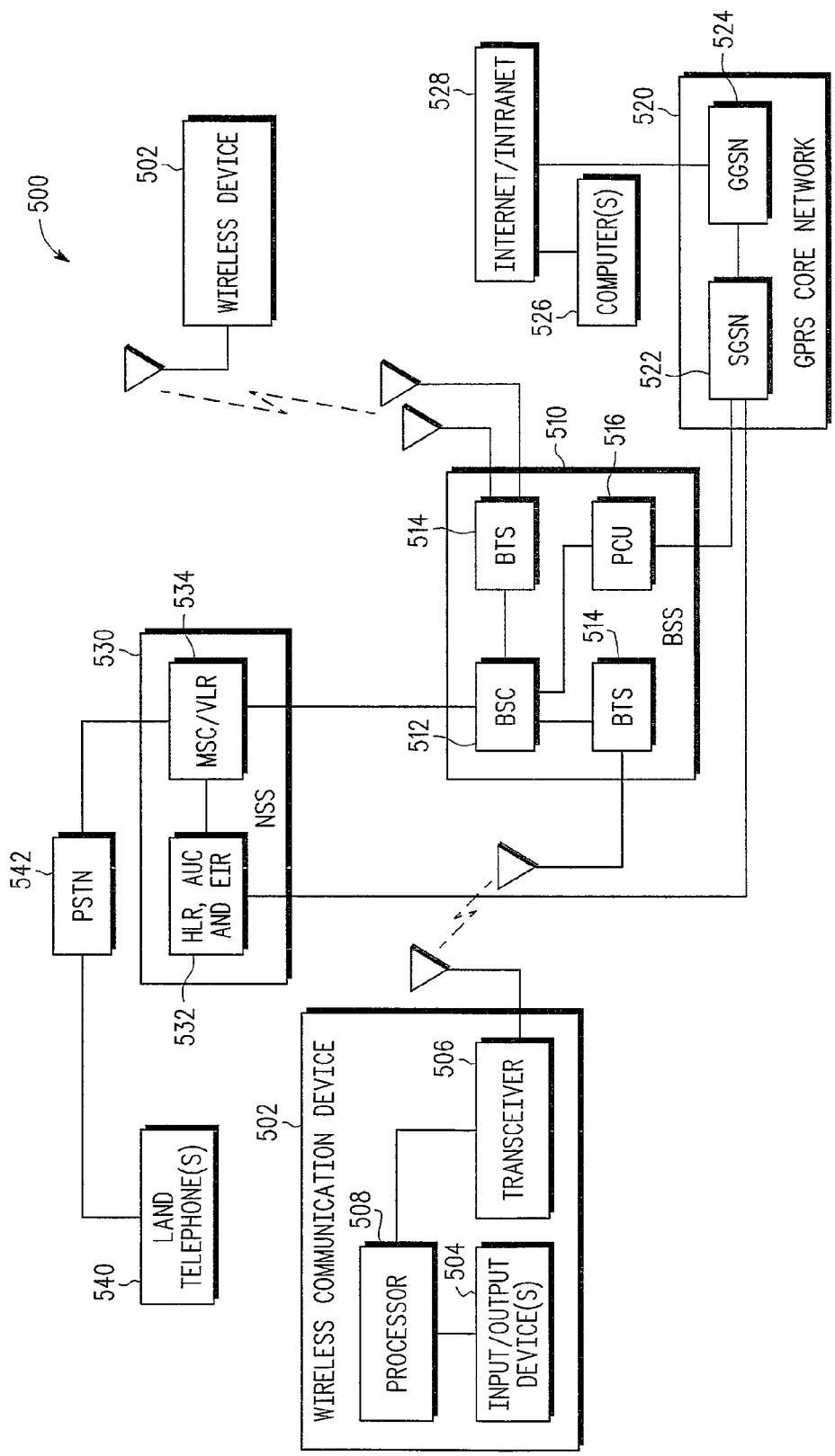
FIG. 5 is a block diagram of an example wireless communication system that includes wireless communication devices that may perform RLP, RLF, and RLR detection according to various embodiments of the present invention.

With reference to FIG. 5, an example wireless communication system 500 is depicted that includes a plurality of subscriber stations or wireless communication devices 502, e.g., hand-held computers, personal digital assistants (PDAs), cellular telephones, etc., that may perform radio link problem (RLP), radio link failure (RLF), and radio link recovery (RLR) detection according to one or more embodiments of the present disclosure. In general, the devices 502 include a processor 508 (e.g., a digital signal processor (DSP) or an ASIC), a transceiver (including a receiver and a transmitter) 506, and one or more input/output devices 504 (e.g., a camera, a keypad, display, etc.), among other components not shown in FIG. 5. As is noted above, according to various embodiments of the present disclosure, techniques are disclosed that generally improve RLP, RLF, and RLR detection. The devices 502 communicate with a base station controller (BSC) 512 of a base station subsystem (BSS) 510, via one or more base transceiver stations (BTS) 514, to receive or transmit voice and/or data and to receive control signals. In general, the BSC 512 may also be configured to choose a modulation and coding scheme (MCS) for each of the devices 502, based on channel conditions.

The BSC 512 is also in communication with a packet control unit (PCU) 516, which is in communication with a serving general packet radio service (GPRS) support node (SGSN) 522. The SGSN 522 is in communication with a gateway GPRS support node (GGSN) 524, both of which are included within a GPRS core network 520. The GGSN 524 provides access to computer(s) 526 coupled to Internet/intranet 528. In this manner, the devices 502 may receive data from and/or transmit data to computers coupled to the Internet/intranet 528. For example, when the devices 502 include a camera, images may be transferred to a computer 526 coupled to the Internet/intranet 528 or to another one of the devices 502. The BSC 512 is also in communication with a mobile switching center/visitor location register (MSC/VLR) 534, which is in communication with a home location register (HLR), an authentication center (AUC), and an equipment identity register (EIR) 532. In a typical implementation, the MSC/VLR 534 and the HLR, AUC, and EIR 532 are located within a network and switching subsystem (NSS) 530, which performs various functions for the system 500. The SGSN 522 may communicate directly with the HLR, AUC, and EIR 532. As is also shown, the MSC/VLR 534 is in communication with a public switched telephone network (PSTN) 542, which facilitates communication between wireless devices 502 and land telephone(s) 540.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

Although the invention is described herein with reference to specific embodiments, various modifications and changes can be made without departing from the scope of the present invention as set forth in the claims below. For example, many of the techniques disclosed herein are broadly applicable to a wide variety of wireless communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for radio link detection in a wireless communication system, comprising: at a subscriber station, estimating a first error rate of an indicator channel, wherein the indicator channel includes an indication of a number of symbols in a control channel; where the estimating of the first error rate is based on one or more reference signals associated with the indicator channel; estimating a second error rate of the control channel; where the estimating of the second error rate is based on one or more reference signals associated with the control channel; combining the first error rate of the indicator channel with the second error rate of the control channel to provide a combined performance metric based on both the indicator channel and the control channel; determining whether a radio link problem exists based on the combined performance metric exceeding a first threshold; and if the radio link problem exists, disabling transmission by the subscriber station.

2. The method of claim 1, further comprising: indicating a radio link failure when the radio link problem persists for a first time period.

3. The method of claim 1, further comprising: indicating a radio link recovery when the combined performance metric is below a second threshold.

4. The method of claim 1, wherein the first and second error rates are block error rates.

5. The method of claim 1, wherein the indicator channel is a physical control format indicator channel.

6. The method of claim 1, wherein the control channel is a physical downlink control channel.

7. The method of claim 1, wherein the first and second error rates are scaled and then added together to provide the combined performance metric.

8. The method of claim 1, wherein the estimating a first error rate of an indicator channel further comprises:
estimating a signal-to-interference-and-noise ratio for the indicator channel; and
mapping the estimated signal-to-interference-and-noise ratio for the indicator channel to the first error rate, and wherein the estimating a second error rate of the control channel further comprises:
estimating a signal-to-interference-and-noise ratio for the control channel; and
mapping the estimated signal-to-interference-and-noise ratio for the control channel to the second error rate.

9. The method of claim 1, wherein the first error rate is based on an effective signal-to-interference-and-noise ratio for the indicator channel that is based on signal-to-interference-and-noise ratios for respective reference signals located on opposite sides of the indicator channel.

10. The method of claim 1, wherein the second error rate is based on an effective signal-to-interference-and-noise ratio for the control channel that is based on signal-to-interference-and-noise ratios for respective reference signals located on opposite sides of the control channel.

11. The method of claim 1, wherein the first and second error rates are averaged over a predetermined time period.

12. A wireless communication device, comprising: a transmitter; a receiver; and a processor coupled to the receiver, wherein the processor is configured to: estimate a first error rate of an indicator channel, wherein the indicator channel includes an indication of a number of symbols in a control channel, estimate a second error rate of the control channel; combine the first error rate of the indicator channel with the second error rate of the control channel to provide a combined performance metric based on both the indicator channel and the control channel, where the combined performance metric comprises an estimated combined Block Error Rate (BLER) of the indicator channel and the control channel; and determine whether a radio link problem exists based on the combined performance metric exceeding a first threshold, wherein the processor is further configured to, when the radio link problem exists, power down the transmitter.

13. The wireless communication device of claim 12, wherein the processor is further configured to:
indicate a radio link failure when the radio link problem persists for a first time period.

14. The wireless communication device of claim 12, wherein the processor is further configured to:
indicate a radio link recovery when the combined performance metric is below a second threshold.

15. The wireless communication device of claim 12, wherein the first and second error rates are block error rates, and wherein the indicator channel is a physical control format indicator channel and the control channel is a physical downlink control channel.

16. The wireless communication device of claim 12, wherein the first error rate is based on an effective signal-to-interference-and-noise ratio for the indicator channel that is based on signal-to-interference-and-noise ratios for respective reference signals located on opposite sides of the indicator channel, and wherein the second error rate is based on an effective signal-to-interference-and-noise ratio for the control channel that is based on signal-to-interference-and-noise ratios for respective reference signals located on opposite sides of the control channel.

17. The wireless communication device of claim 12, wherein the first and second error rates are averaged over a predetermined time period.

18. A method for radio link detection in a wireless communication system, comprising: estimating a first signal-to-interference and noise ratio (SINR) for a control channel based on one or more reference signals associated with the control channel; estimating a second SINR for an indicator channel based on one or more reference signals associated with the indicator channel, wherein the indicator channel provides an indication of a number of symbols in the control channel; generating a combined effective SINR by combining both the first SINR for the control channel with the second SINR of the indicator channel; mapping the combined effective SINR to a block error rate; determining whether a radio link problem, a radio link failure, or a radio link recovery exists based on the block error rate exceeding a threshold; and if the radio link failure exists, reporting the radio link failure.

19. A method for radio link detection in a wireless communication system, comprising: estimating a first error rate of an indicator channel, wherein the indicator channel includes an indication of a number of symbols in a control channel; where the estimating of the first error rate is based on one or more reference signals associated with the indicator channel; estimating a second error rate of a control channel; where the estimating of the second error rate is based on one or more reference signals associated with the control channel; combining the first error rate of the indicator channel with the second error rate of the control channel to provide a combined performance metric based on both the indicator channel and the control channel; determining if a radio link problem exists based on the combined performance metric exceeding a threshold; and if the radio link problem exists, causing a subscriber station to disable transmission.

20. A wireless communication device, comprising: a transmitter; a receiver; and a processor coupled to the receiver, wherein the processor is configured to: estimate a first error rate of an indicator channel, wherein the indicator channel includes an indication of a number of symbols in a control channel; estimate a second error rate of the control channel; where the estimate of the first and second error rates are based on one or more channel estimates; combine the first error rate of the indicator channel with the second error rate of the control channel to provide a combined performance metric based on both the indicator channel and the control channel; and detecting if a radio link problem exists based on the combined performance metric exceeding a threshold, wherein if the radio link problem exists, powering down the transmitter.

21. A method for radio link detection in a wireless communication system, comprising:
    estimating a first error rate of an indicator channel, wherein the indicator channel includes an indication of a number of symbols in a control channel;
    where the estimating of the first error rate is based on one or more reference signals associated with the error channel;
    estimating a second error rate of a control channel;
    where the estimating of the second error rate is based on one or more reference signals associated with the control channel;
    combining the first and second error rates to provide a performance metric, where the first and second error rates are scaled and then added together to provide the performance metric;
    determining whether a radio link problem exists based on the performance metric; and
    when the radio link problem exists, causing a subscriber station to disable transmission.

22. The method of claim 21, further comprising:
    indicating a radio link problem when the performance metric is above a first threshold.

23. The method of claim 22, further comprising:
    indicating a radio link failure when the radio link problem persists for a first time period.

24. The method of claim 21, further comprising:
    indicating a radio link recovery when the performance metric is below a second threshold.

25. The method of claim 21, wherein the first and second error rates are block error rates.

26. The method of claim 21, wherein the indicator channel is a physical control format indicator channel.

27. The method of claim 21, wherein the control channel is a physical downlink control channel.

28. The method of claim 21, wherein the estimating a first error rates of an indicator channel further comprises:
    estimating a signal-to-interference-and-noise ratio for the indicator channel; and
    mapping the estimated signal-to-interference-and-noise ratio for the indicator channel to the first error rate, and wherein the estimating a second error rate of the control channel further comprises:
    estimating a signal-to-interference-and-noise ratio for the control channel; and
    mapping the estimated signal-to-interference-and-noise ratio for the control channel to the second error rate.

29. The method of claim 21, wherein the first error rate is based on an effective signal-to-interference-and-noise ratio for the indicator channel that is based on signal-to-interference-and-noise ratios for respective reference signals located on opposite sides of the indicator channel.

30. The method of claim 21, wherein the second error rate is based on an effective signal-to-interference-and-noise ratio for the control channel that is based on signal-to-interference-and-noise ratios for respective reference signals located on opposite sides of the control channel.

31. The method of claim 21, wherein the first and second error rates are averaged over a predetermined time period.

32. A wireless communication device, comprising: a transmitter; a receiver; and computerized logic in data communication with to the receiver and transmitter, the logic configured to enable the wireless communication device to: estimate a first error rate of an indicator channel, the indicator channel comprising an indication of a number of symbols in a control channel; estimate a second error rate of the control channel; combine the first error rate of the indicator channel with the second error rate of the control channel to provide a combined performance metric based on both the indicator channel and the control channel, the combined performance metric comprising an estimated combined Block Error Rate (BLER) of the indicator channel and the control channel; and determine whether a radio link problem exists based on at least the combined performance metric exceeding a first threshold; and wherein the logic is further configured to, when the radio link problem exists, power down the transmitter.

33. The wireless communication device of claim 32, wherein the logic is further configured to indicate a radio link failure when the radio link problem persists for at least a first time period.

34. The wireless communication device of claim 32, wherein the logic is further configured to indicate a radio link recovery when the combined performance metric is less than a second threshold.

35. The wireless communication device of claim 32, wherein the first and second error rates comprise block error rates, the indicator channel comprises a physical control format indicator channel, and the control channel comprises a physical downlink control channel.

36. The wireless communication device of claim 32, wherein the first error rate is based at least in part on an estimated signal-to-interference-and-noise ratio for the indicator channel, the estimated signal-to-interference-and-noise ratio based at least on signal-to-interference-and-noise ratios for respective reference signals located on opposite sides of the indicator channel.

37. The wireless communication device of claim 36, wherein the second error rate is based at least in part on an estimated signal-to-interference-and-noise ratio for the control channel, the estimated signal-to-interference-and-noise ratio based at least on signal-to-interference-and-noise ratios for respective reference signals located on opposite sides of the control channel.

38. The wireless communication device of claim 32, wherein the logic is further configured to average the first and second error rates over a predetermined time period.

* * * * *